United States Patent
Adler

(10) Patent No.: US 7,345,430 B2
(45) Date of Patent: Mar. 18, 2008

(54) ELECTRICAL ENERGY DISCHARGE CONTROL

(75) Inventor: Richard J. Adler, Marana, AZ (US)

(73) Assignee: Ionatron, Inc., Tucson, AZ (US)

( * ) Notice: Subject to any disclaimer, the term of this patent is extended or adjusted under 35 U.S.C. 154(b) by 40 days.

(21) Appl. No.: 11/345,416

(22) Filed: Feb. 1, 2006

(65) Prior Publication Data

US 2007/0176561 A1   Aug. 2, 2007

(51) Int. Cl.
*H05B 37/02* (2006.01)

(52) U.S. Cl. .................. 315/158; 315/150; 315/149

(58) Field of Classification Search ........... 315/236, 315/46–49, 94–107, 66, 149–159, 209 R, 315/247, 248, 274–287, 291, 307
See application file for complete search history.

(56) References Cited

U.S. PATENT DOCUMENTS

| | | | | |
|---|---|---|---|---|
| 4,291,661 A | * | 9/1981 | Gerry | 123/606 |
| 4,988,920 A | * | 1/1991 | Hoeksma | 315/101 |
| 5,039,921 A | * | 8/1991 | Kakitani | 315/307 |
| 5,565,114 A | * | 10/1996 | Saito et al. | 216/60 |
| 5,980,767 A | * | 11/1999 | Koshimizu et al. | 216/60 |
| 6,421,362 B1 | * | 7/2002 | Matsunaga | 372/38.02 |
| 6,727,455 B1 | * | 4/2004 | Ukai et al. | 219/69.18 |
| 2003/0006720 A1 | * | 1/2003 | Borella et al. | 315/291 |
| 2003/0160577 A1 | * | 8/2003 | Noguchi et al. | 315/291 |
| 2004/0113566 A1 | * | 6/2004 | Nemirow | 315/291 |

* cited by examiner

*Primary Examiner*—Tuyet Vo
(74) *Attorney, Agent, or Firm*—Marsh Fischmann & Breyfogle LLP; Gregory T. Fettig

(57) ABSTRACT

Systems and methods presented herein provide for the control of electrical energy discharge from an electrode. In this regard, a sensor detects electrical energy discharged from the electrode and generates an electronic signal representative of a detected electrical energy discharge. Such a sensor may detect an electric field and/or light from the electrical energy discharge. The sensor may generate the electronic signal therefrom for subsequent processing. Accordingly, the system also includes a controller communicatively coupled to the sensor to determine a spurious discharge of the electrical energy discharge from the electrode. The controller processes the electronic signal to control at least one characteristic (e.g., voltage) of the electrical energy provided to the electrode. The controller may change a voltage of the electrical energy to the electrode in response to determining a spurious discharge of the electrical energy discharged from the electrode.

7 Claims, 6 Drawing Sheets

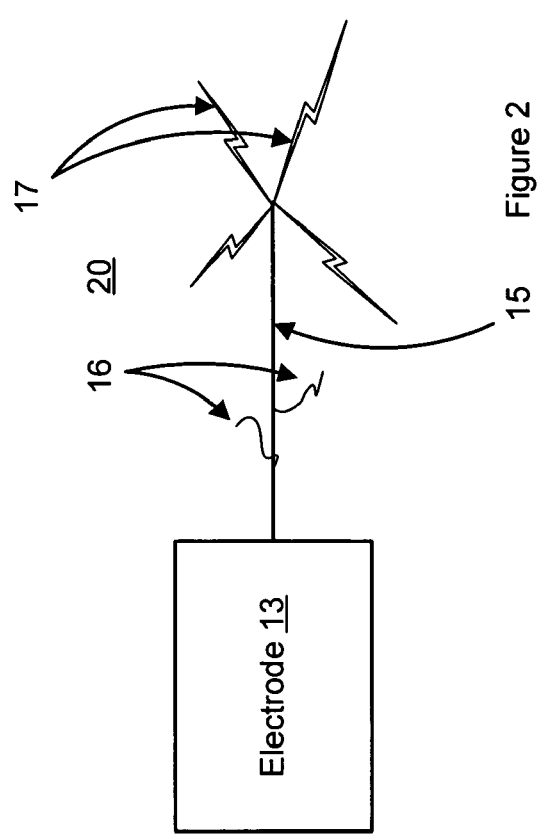
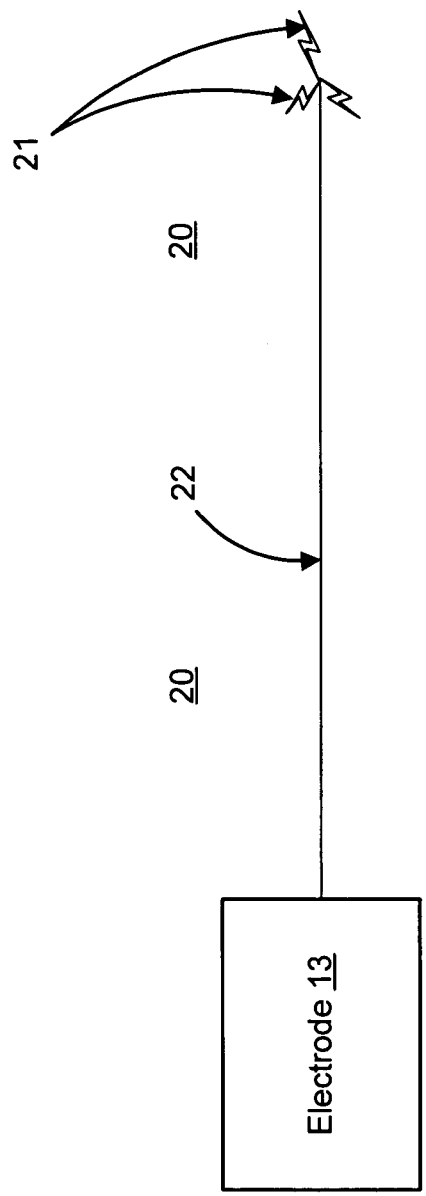

ELECTRICAL ENERGY DISCHARGE CONTROL

TECHNICAL FIELD

Systems and methods presented herein generally relate to electrical energy discharges and more specifically to controlling growth of such discharges.

BACKGROUND

Transferring electrical energy may be performed in a variety of manners. For example, electrical energy may be transferred from an electrical energy source to another point through the use of traditional electrical conductors, such as metal wires or cables. Generally, the conductors guide the electrical energy from the electrical energy source to a point where the electrical energy is to be used.

Some devices, such as Tesla coils, and other high voltage sources, may be used to initiate the transfer electrical energy through a gas, such as air, without the need for such traditional conductors. In transferring the electrical energy, these devices may create "streamers" which do not move in an intended direction and/or occur at intended time. This electrical energy discharge, however, is uncontrolled and quickly dissipates. Because the uncontrolled electrical energy discharges of a high voltage source provide little more than interesting flashes of light, the discharges are used primarily for demonstrative and/or entertainment purposes.

SUMMARY

Systems and methods presented herein provide for the control of electrical energy discharge from an electrode. In this regard, a first aspect of the invention is generally directed to a sensor that detects electrical energy discharged from the electrode and generates an electronic signal representative of a detected electrical energy discharge. The system also includes a controller communicatively coupled to the sensor. The controller processes the electronic signal to control at least one characteristic of the electrical energy (e.g., voltage) provided to the electrode.

The sensor may include an optical detector that detects light from the electrical energy discharge from the electrode. Alternatively, or in addition to, the sensor may include an electric field sensor that detects an electric field emanating from the electrical energy discharged from the electrode. In either case, the sensor may generate the electronic signal therefrom such that the controller may determine an occurrence of a spurious discharge. In this regard, the controller may change a voltage of the electrical energy to the electrode in response to determining a spurious discharge.

In one embodiment, the controller decreases voltage of the electrical energy to the electrode in response to determining a spurious discharge of the electrical energy from the electrode. Additionally, the controller may increase the voltage of the electrical energy to the electrode subsequent to decreasing the voltage of the electrical energy to increase distance of an electrical energy discharge. For example, spurious discharges may drain electrical energy from a preferential path of conduction. By decreasing the voltage, the spurious discharges may diminish through cooling of spurious discharge paths. The voltage may be increased thereafter to continue conduction through the preferential path.

The system may further include a uniquely controllable power supply such as an arbitrary waveform generator that provides the electrical energy to the electrode. The system may also include a switch communicatively coupled to the controller to pulse the electrical energy from the power supply to the electrode. As such, the controller may operate the switch to control the pulse width of electric energy. In one embodiment, the switch is an Insulated Gate Bipolar Transistor ("IGBT") switch. However, other devices such as thyratrons may be used. Additionally, electrical energy provided to the electrode from the power supply may be substantially unipolar. For example, the power supply may generate high-voltage alternating current electrical energy which is subsequently rectified to a substantially unipolar signal (e.g., where the voltage is either positive or negative, excluding the effects of bias).

Another aspect of the invention is generally directed to a method of controlling electrical energy discharge. The method includes detecting a spurious discharge from an electrode. The method also includes decreasing voltage of electrical energy to the electrode in response to detecting a spurious discharge and increasing the voltage of the electrical energy to the electrode subsequent to decreasing the voltage to increase distance of the electrical energy discharge.

Detecting a spurious discharge from the electrode may include sensing light emanating from the spurious discharge. Alternatively, or in addition to, detecting a spurious discharge from the electrode may include sensing an electric field from the spurious discharge. In response to detecting, the method may further include generating a signal used to maintain, decrease, or increase the voltage of the electrical energy. For example, a sensor may be used to detect a spurious discharge and generate a signal therefrom. That signal may be processed to determine desired voltage changes in the electrical energy. Accordingly, the method may further include processing the signal to determine a change in the voltage of the electrical energy. Additionally, the method may include generating a control signal in response to processing the signal and transferring the control signal to a controller to maintain, decrease, or increase the voltage of the electrical energy. In one embodiment, the method further includes providing a delay between decreasing the voltage and increasing the voltage to deter conduction via the spurious discharge.

Another aspect of the invention is generally directed to a circuit that controls discharge of electrical energy. The circuit includes a power supply and a switch coupled to the power supply. The circuit also includes a controller coupled to the switch that processes information about a spurious discharge, wherein the controller operates the switch to change voltage of electrical energy provided to an electrode.

Yet another aspect of the invention is generally directed to a system that controls electrical energy discharge. The system includes a power supply that generates electrical energy and an electrode coupled to the power supply to discharge the electrical energy. The system also includes a sensor that detects the electrical energy discharged from the electrode and generates a signal therefrom. Additionally, the system includes a controller communicatively coupled to the sensor, wherein the controller processes the signal to control the voltage of the electrical energy.

BRIEF DESCRIPTION OF THE DRAWINGS

FIG. 2 illustrates an exemplary electrical energy discharge.

FIG. 3 illustrates another exemplary electrical energy discharge.

DETAILED DESCRIPTION OF THE DRAWINGS

Figure 1:
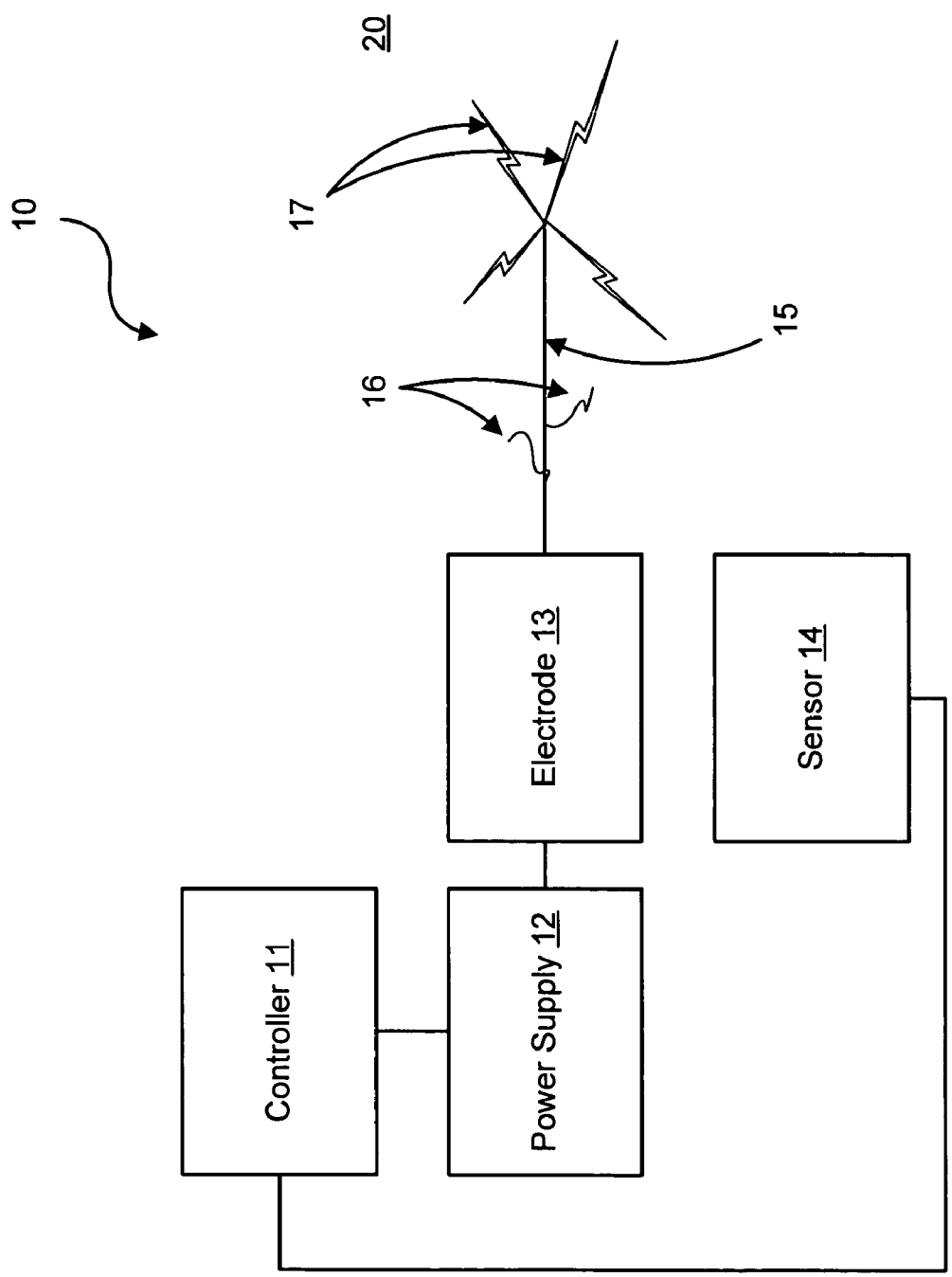
FIG. 1 illustrates a block diagram of a system for controlling electrical energy discharge from an electrode.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

FIG. 1 is a block diagram of system 10 for controlling electrical energy discharge from electrode 13. System 10 may be used to discharge electrical energy in a directional manner to controllably deliver the electrical energy to a point distal to system 10. For example, system 10 uses power supply 12 to deliver electrical energy to electrode 13. System 10 also includes controller 11 that controls certain characteristics of electrical energy supplied to electrode 13 such that electrode 13 discharges the electrical energy in an extended directional manner. Examples of such characteristics include Pulse Width ("PW"), Pulse Repetition Frequency ("PRF"), Pulse Repetition Interval ("PRI"), voltage, and/or pulse current.

When controller 11 provides electrical energy from power supply 12 to electrode 13, the electrical energy may reach a voltage that causes gas region 20 to breakdown. The electrical energy may subsequently conduct through the gas region along path 15. Certain attributes of gas region 20 (e.g., humidity, temperature, gas composition, impurities, pressure, etc.), however, may drain electrical energy from the intended conduction along path 15 via spurious discharges. As such, the electrical energy discharge along path 15 may dissipate into gas region 20 before the electrical energy reaches a desired distance (see e.g., spurious electrical energy discharges 16 and 17 along discharge path 15). System 10, and more specifically controller 11, may account for such attributes by controlling delivery of electrical energy to electrode 13. For example, sensor 14 may detect spurious electrical energy discharges 16 and/or 17 along path 15 to produce an electronic control signal. Controller 11 may process the control signal from sensor 14 and correspondingly control PW, PRF, PRI, voltage, pulse current, etc. from power supply 12 to extend the discharge of electrical energy from electrode 13. Exemplary discharges are shown in FIGS. 2 and 3.

FIGS. 2 and 3 illustrate contrasting examples of electrical energy discharges from system 10. More specifically, FIG. 2 illustrates an electrical energy discharge from electrode 13 having energy-draining spurious discharges 16 and 17 whereas FIG. 3 illustrates an electrical energy discharge from electrode 13 along an extended path (i.e., path 22) in response to controlling certain electrical energy characteristics (e.g., upon detecting electrical energy discharges 16 and/or 17 with sensor 14 of FIG. 1). As mentioned, sensor 14 may detect electrical energy discharges 16 and 17 of FIG. 2. Sensor 14 may generate a corresponding electronic signal representative of the detected discharges. Controller 11 may receive the control signal from sensor 14 to control PW, PRF, PRI, voltage, pulse current, etc. from power supply 12. In response to such control, electrode 13 may discharge electrical energy along path 22 such that electrical energy 21 travels further than a previous discharge (e.g., electrical energy discharge 17 of FIG. 2). Additionally, the electrical energy may conduct into gas region 20 with fewer spurious discharges along path 22 (e.g., such as spurious electrical energy discharges 16 along path 15 of FIG. 2).

In one embodiment, sensor 14 is an "EDOT" sensor that senses electric field change (e.g., differential electric field on a millisecond time scale). An exemplary EDOT sensor may include an electric field change meter having a "flat plate" antenna that is backed by a charge amplifier and a driver. The EDOT sensor may also include an analog-to-digital converter ("ADC") that converts a detection signal to a digital format for processing by controller 11. For example, the data sensor may detect an electric field change and generate an electronic signal representative thereof. The ADC may convert the electronic signal to a digital signal such that controller 11 may process the signal and determine the change in the electric field.

Alternatively, or in addition to, that sensor 14 includes an optical sensor that senses light emanating from the electrical energy discharge. For example, as electrical energy is propagated through gas region 20, the electrical energy may generate light (e.g., similar to Tesla coil discharges). A brighter light may indicate that an electrical energy discharge is relatively close to electrode 13. Since extension of the electrical energy discharges may be desired, sensor 14 may detect light and generate a corresponding electronic signal for processing by controller 11. Controller 11 may thereby control power supply 12 to change the characteristics of the electrical energy provided to electrode 13, as described hereinabove.

Additionally, sensor 14 may be configured along a conduction path (e.g., conduction path 15 and conduction path 22). For example, sensor 14 may be representative of a plurality of sensors (e.g., optical and/or EDOT) that are configured along the conduction path to observe instances of spurious discharges. As such, sensors that are closer to spurious discharges may provide better estimations of distance and thus determine where the spurious discharges occur. This information may also be processed to improve electrical energy discharge distances.

In one embodiment, power supply 12 includes a loosely coupled inductor (e.g., a Tesla Coil) which transforms electrical energy (e.g., either direct current—"DC"—or alternating current—"AC") from one voltage to another that causes dielectric breakdown of the gas surrounding electrode 13. A loosely coupled inductor is generally configured as a transformer that is capable of transferring up to 50% of the electrical energy from a primary winding to a secondary winding. For example, power supply 12 may include an electrical power source that provides power to a primary winding of a loosely coupled transformer. The loosely coupled transformer may substantially "step up" the voltage of the electrical energy via a secondary winding, albeit with about 50% less electrical energy than the primary winding.

Examples of such transformers are shown and described below in FIGS. 4 and 6. Those skilled in the art, however, should readily recognize that the invention is not intended to be limited to a power supply using the loosely coupled inductor shown and described herein. Rather, other embodiments may use other forms of power supply, such as a high voltage arbitrary waveform generator shown and described in U.S. patent Ser. No. 11/345,173 (filed Feb. 1, 2006 and entitled "High Voltage Generation Systems and Methods".

Figures 4, 5:
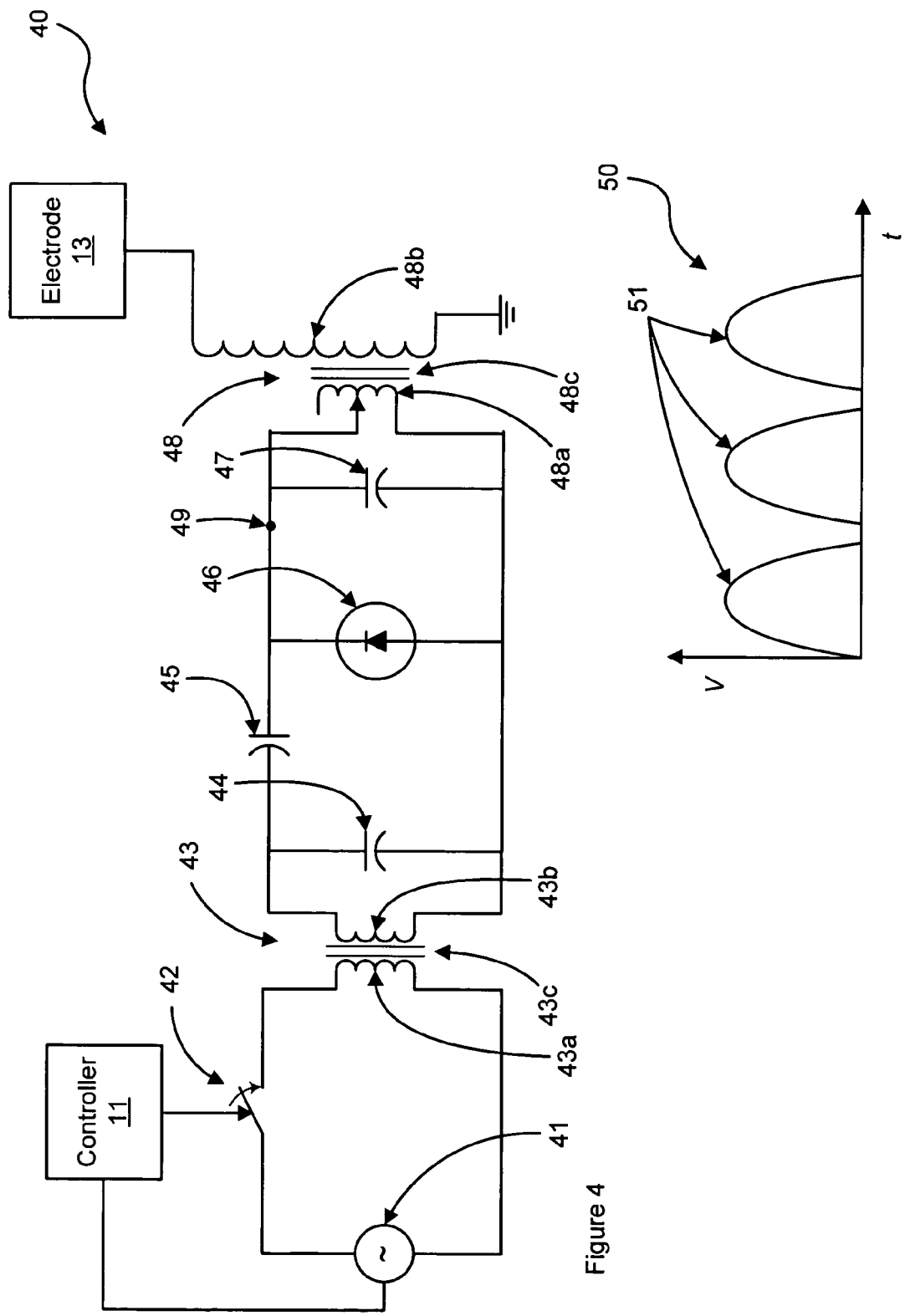
FIG. 4 illustrates an exemplary circuit diagram of a system used to control electrical energy discharge from an electrode.
FIG. 5 illustrates a waveform of a substantially unipolar signal generated by the system of FIG. 4.

FIG. 4 is a circuit diagram of system 40 used to control relatively high-voltage electrical energy discharge from electrode 13. In this embodiment, system 40 includes alternating current ("AC") power supply 41 used to deliver electrical energy to electrode 13. The electrical energy delivered to electrode 13 may be controlled, at least in part, by controller 11. For example, controller 11 may controllably operate switch 42 to conduct electric current through primary winding 43a of transformer 43 and thereby induce a current in secondary winding 43b which may then be transferred to electrode 13. In controlling the electric current through primary winding 43a, controller 11 may operate switch 42 to pulse electric current at a particular PW and/or PRF. Additionally, controller 11 may be coupled to AC power supply 41 to control the magnitude of electric current to primary winding 43a.

Transformer 43 may provide an intrinsically safe means for transferring the electrical energy to electrode 13. For example, conduction of electrical current through primary winding 43a magnetically induces (i.e., via core 43c of transformer 43) electrical current to flow in secondary winding 43b. Transformer 43 may increase, or "step up", the voltage of AC power supply 41 based on a winding ratio, or "turns ratio", of secondary winding 43b to primary winding 43a. The core of transformer 43 enables the voltage increase via magnetic coupling of primary winding 43a and secondary winding 43b, thereby avoiding electrical amplification. In one embodiment, transformer 43 may include a turns ratio that substantially increases the voltage from AC power supply 41. The invention, however, is not intended to be limited to a particular turns ratio for transformer 43. Rather, transformers may be designed to step up, step down, or maintain a voltage as required by a particular application. Those skilled in the art are familiar with transformers and their various designs that allow for such voltage manipulation.

System 40 may include a network of capacitors 44 and 45 and diode 46. This configuration of capacitors 44 and 45 and diode 46 provides substantially unipolar signal 51 as illustrated in voltage versus time graph 50 of FIG. 5. For example, AC power supply 41 may provide an AC signal. Capacitors 44 and 45 coupled with diode 46 may substantially rectify the AC signal such that most of the negative voltage of the AC signal is converted to positive voltage at node 49. Capacitor 47 may be coupled to the network to provide low pass filtering of the substantially unipolar signal. The filtered substantially unipolar signal is then provided to loosely coupled transformer 48.

In this embodiment, capacitor 47 is coupled to primary winding 48a of loosely coupled transformer 48 to provide electrical energy to electrode 13. For example, the low pass filtered signal from capacitor 47 may be conducted through primary winding 48a to magnetically induce electric current in secondary winding 48b via core 48c. Loosely coupled transformer 48 steps up the electrical energy and provides the energy to electrode 13 for discharge.

Loosely coupled transformer 48 may include a turns ratio that substantially steps up (i.e., substantially increases) the voltage from capacitor 47. As stated above, a loosely coupled transformer is generally a transformer that is capable of transferring up to 50% of the electrical energy from a primary winding to a secondary winding. While the loosely coupled transformer may not transfer as much energy as a more "tightly coupled" transformer (e.g., a transformer that transfers greater than 75% of the electrical energy induced by the primary winding), the loosely coupled transformer is typically more capable of stepping up the voltage of electrical energy than the tightly coupled transformer. For example, as the voltage between the primary winding and the secondary winding substantially increases, the potential for dielectric breakdown and thus electrical energy discharge between the primary and secondary windings also increases. An electrical energy discharge between the primary and secondary windings may damage or even destroy a transformer. Loosely coupled transformer 48 avoids such damage by increasing the distance between primary winding 48a and secondary winding 48b over the lengths of the two windings (e.g., first ends of the two windings are closer than second ends).

Figure 6:
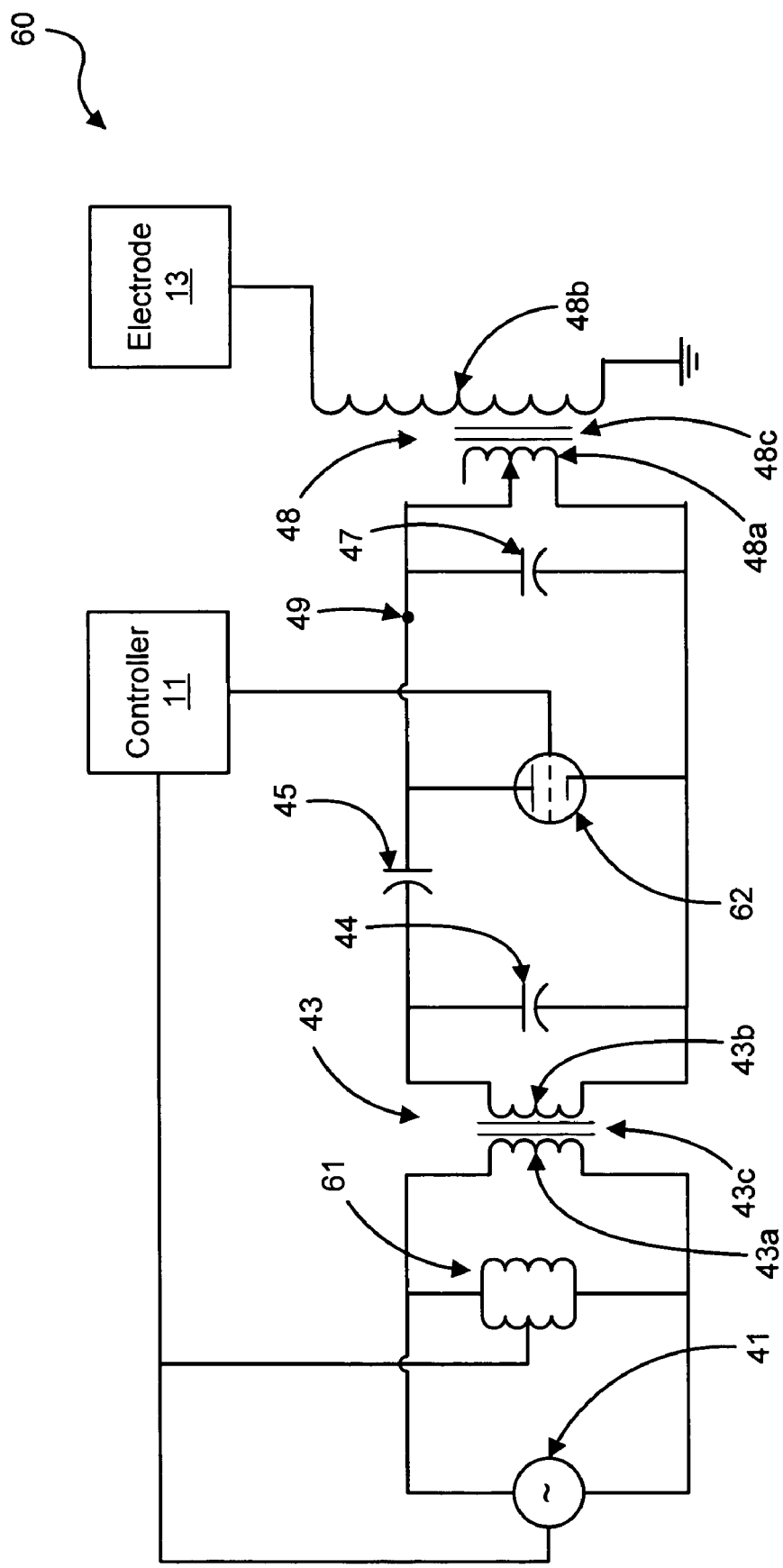
FIG. 6 illustrates an exemplary circuit diagram of another system used to control electrical energy discharge from an electrode.

FIG. 6 illustrates an alternative exemplary circuit diagram of system 60 used to control electrical energy discharge from electrode 13. For example, system 60 employs components that differ with respect to system 40 of FIG. 4 while providing functionality that is similar to system 40. One example of the differences between system 40 and system 60 regards current transformer 61 to sense electrical conduction to electrode 13. For example, current transformer 61 may measure current for power management and/or control of electrical energy delivery to electrode 13. Those skilled in the art are readily familiar with current transformers.

Another example regards thyristor 62 in place of diode 46 of FIG. 4. In this embodiment, system 60 is further configured with thyristor 62 to provide a substantially unipolar waveform as described hereinabove (e.g., substantially unipolar signal 50 of FIG. 5). For example, power supply 41 may provide an AC signal. Controller 11 may be coupled to provide a control signal between a gate and a cathode of thyristor 62. Thyristor 62 may controllably conduct current in one direction when triggered by the control signal of controller 11. Accordingly, the negative currents of the AC signal are rectified to provide a substantially unipolar signal. Those skilled in the art are readily familiar with thyristors and their various uses, particularly those uses in high voltage switching.

In addition to controlling the supplied power to provide the substantially unipolar signal, controller 11 may control thyristor 62 to control electrical energy discharge from electrode 13. For example, controller 11 may generate a control signal that is used turn power supply 41 on and off. In such an embodiment, controller 11 may pulse the control signal at a particular PW and/or PRF. Additionally, controller 11 may use the control signal to control the magnitude of electric current to primary winding 43a. As in FIG. 4, capacitor 47 low pass filters the output at node 49 and the substantially unipolar signal is provided to loosely coupled transformer 48 for subsequent electrical energy discharge from electrode 13.

Although FIGS. 4 and 6 illustrate loosely coupled transformer 48, the invention is not intended-to be limited to such a transformer. Rather, other embodiments may include Tesla coils which are, in essence, variations of loosely coupled transformers. For example, a Tesla coil may be considered a transformer that is "less coupled" than other transformers. As such, Tesla coils may be used to substantially step up voltage from a primary winding to a secondary winding, albeit with less energy transfer. Still, other embodiments may include a transformer that is more tightly coupled (e.g., when substantial voltage increases are not necessary for particular applications) or even an arbitrary waveform generator, as described hereinabove.

Figure 7:
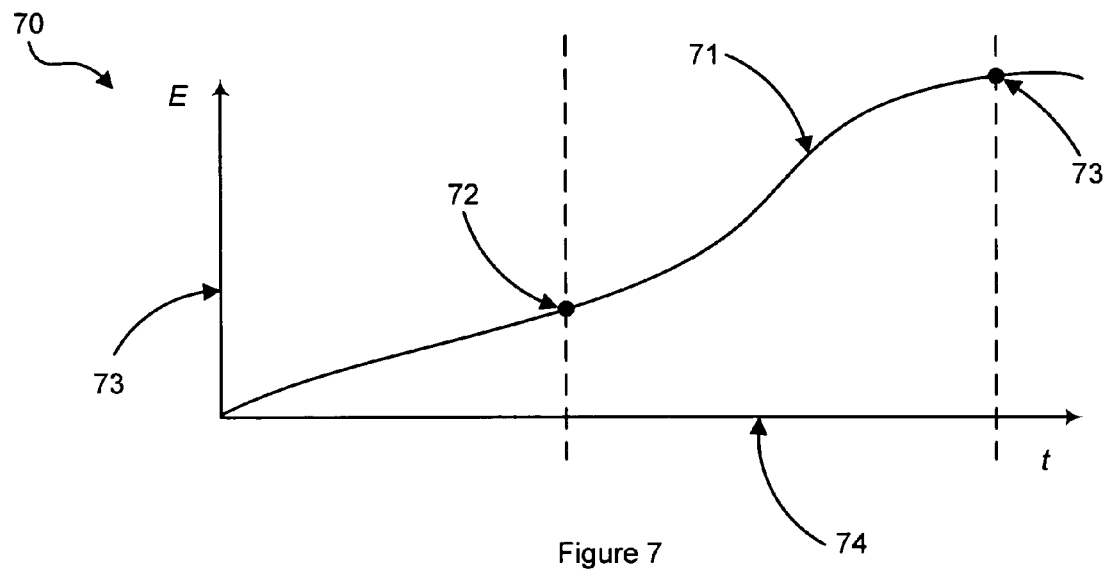
FIG. 7 is a graph illustrating the magnitude of an exemplary electric field over time.
Figure 8:
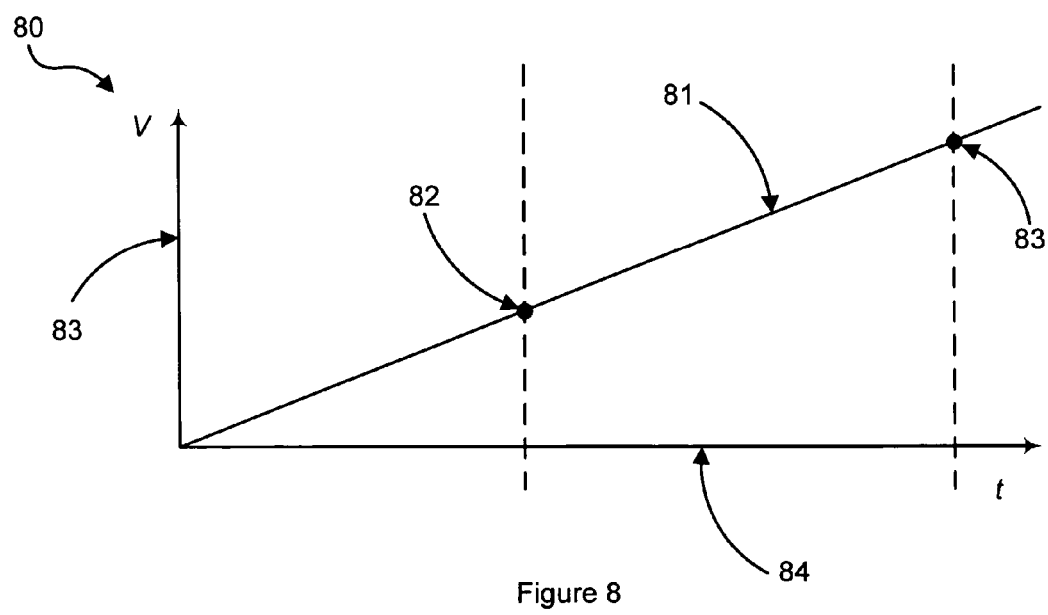
FIG. 8 is a graph illustrating the voltage of electrical energy corresponding to the exemplary electric field of FIG. 6 over time.

FIG. 7 illustrates graph 70 with the magnitude of an exemplary electric field 71 (axis 73) over time (axis 74). For example, power supply 12 of FIG. 1 may provide electrical energy to electrode 13 of FIG. 1 over a period of time. The voltage of the electrical energy at electrode 13 may increase over time. As such, the magnitude of the electric field 71 increases over time. FIG. 8 is a graph that illustrates such an increase in voltage. For example, graph 80 of FIG. 8 illustrates voltage of the electrical energy 81 (axis 83) corresponding to the exemplary electric field of FIG. 7 over time (axis 84). The voltage is substantially linear because, among other reasons, the spatial extent of the electric field determines the EDOT response along with the voltage. Accordingly, an EDOT signal may be a combination of two effects with the difference being a signature of a spurious discharge. In addition to illustrating their respective magnitudes, graphs 70 and 80 illustrate reference points and may be useful in determining distance of electrical energy discharge. For example, graph 70 illustrates reference points 72 and 73 along the magnitude of electric field 71 and graph 80 illustrates reference points 82 and 83 along the voltage of the electrical energy 81 at points in time that correspond to reference points 72 and 73. The magnitude value of voltage 81 at reference point 82 divided by the magnitude value of electric field 71 at reference point 72 yields a first reference point value $k_1$ as follows:

$$\frac{V_{82} \text{ volts}}{E_{72} \frac{\text{volts}}{\text{meter}}} k_1 \text{ meters.} \qquad \text{(Eq. 1)}$$

Specifically, the value $k_1$ may include information regarding a spurious discharge. For example, in the absence of spurious discharges, the capacitive coupling between the channel and the EDOT is greater when a discharge is longer, and less when a discharge is shorter. Similarly, the magnitude value of voltage 81 at reference point 83 divided by the magnitude value of electric field 71 at reference point 73 yields a second reference point value $k_2$ as follows:

$$\frac{V_{83} \text{ volts}}{E_{73} \frac{\text{volts}}{\text{meter}}} k_2 \text{ meters.} \qquad \text{(Eq. 2)}$$

Figure 9:
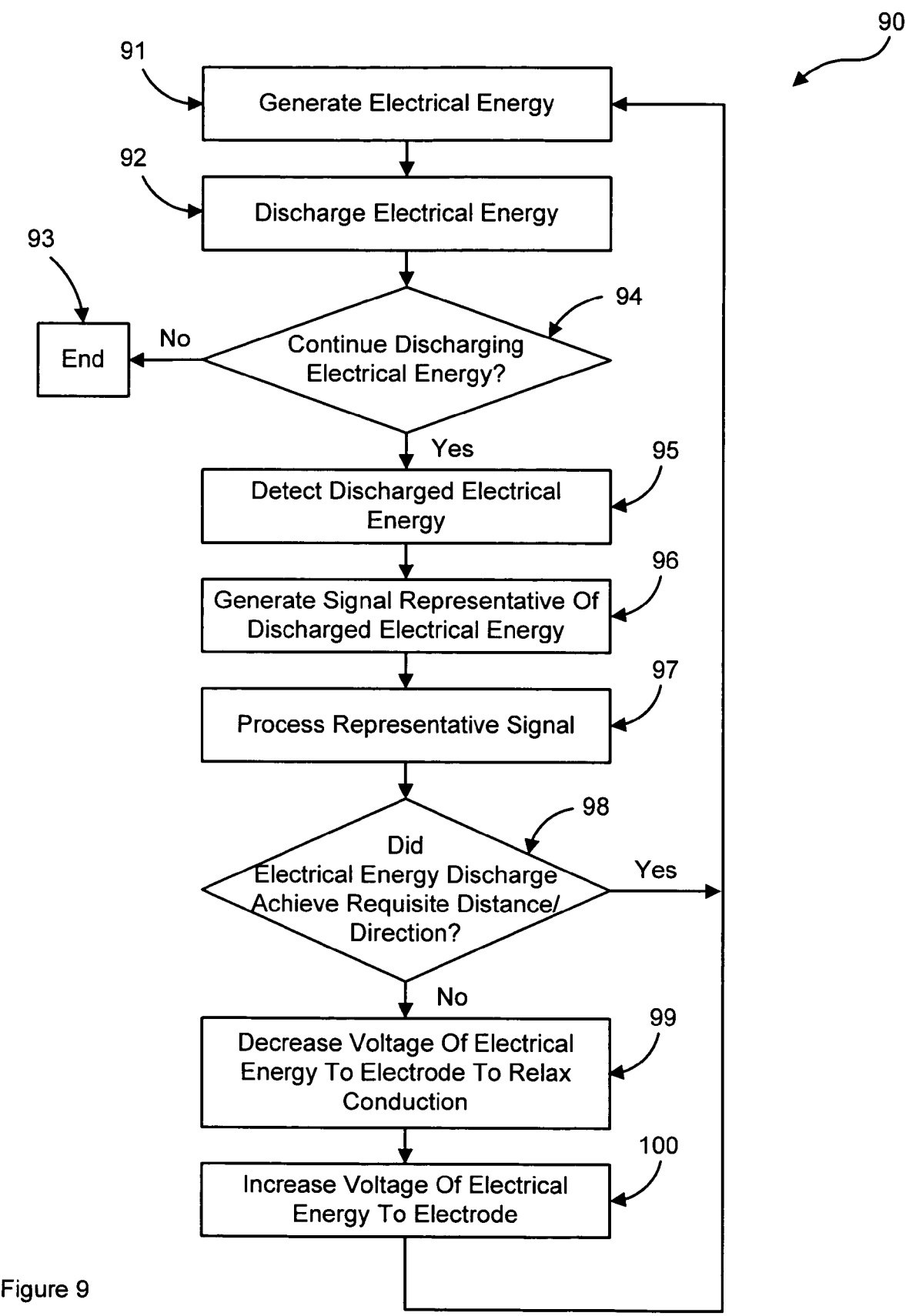
FIG. 9 is a flowchart illustrating an exemplary process for controlling electrical energy discharge from an electrode.

FIG. 9 is a flowchart illustrating process 90 for controlling electrical energy discharge from an electrode. In this embodiment, electrical energy is generated in process element 91. For example, a power supply, such as power supply 12 of FIG. 1, may generate high voltage AC electrical energy for discharge from an electrode, such as electrode 13 of FIG. 1. When the electrical energy at the electrode has a magnitude that is sufficient to cause dielectric breakdown of a gas surrounding the electrode, electrical energy is discharged, in process element 92. Afterwards, a decision may be made to continue discharging electrical energy, in process element 94. If a determination is made to not continue discharging electrical energy, process 90 ends in process element 93. If, however, a determination is made to continue discharging electrical energy, process 90 continues with the detection of the discharged electrical energy, in process element 95.

Detection of discharged electrical energy may be used to improve present or subsequent electrical energy discharges. For example, when the electrical energy is discharged from the electrode, a sensor may be configured to detect the electrical energy. The sensor may generate a signal representative of the discharged electrical energy, in process element 96. The representative signal may be transferred from the sensor to a controller, such as controller 11 of FIG. 1. The controller may then process the representative signal, in process element 97, to determine whether the electrical energy discharge achieves a requisite distance and/or direction (e.g., process element 98) and thereby control various aspects of the electrical energy (e.g., voltage, current, PRF, PW, etc.) to increase distance of the discharge.

If the electrical energy discharge did achieve a requisite distance and/or direction, process 90 may return to process element 91 to generate electrical energy for subsequent electrical energy discharges. If, however, the electrical energy discharge did not achieve a requisite distance and/or direction, the controller may control the power supply to decrease voltage of the electrical energy to the electrode such that at least a portion of a conduction path (i.e., a path of a previous electrical energy discharge) may relax, in process element 99. For example, as electrical energy is discharged, the electrical energy may form a preferential path of conduction as well as spurious discharge paths that undesirably drain electrical energy from a preferential path of conduction. By decreasing the voltage of electrical energy to the electrode, the prior spurious discharge paths may cool and therefore deter preferential conduction through those paths. Afterwards, voltage of the electrical energy to the electrode may be increased, in process element 100, to discharge to the preferred conduction path substantially free of such spurious discharges. Process 90 subsequently returns to process element 91 to discharge electrical energy.

Although process 90 illustrates a plurality of process elements used in controlling electrical energy discharge, those skilled in the art should readily recognize that the invention is not intended to be limited to such process elements. Rather, certain process elements may be arranged in other manners or even removed to achieve electrical energy discharge control. For example, process elements 99 and 100 may be altered to perform spurious discharge path relaxation in other ways, such as through the control of PW and PRF upon returning to process element 91.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A system that controls electrical energy discharge from an electrode, including:
   a sensor that detects electrical energy discharged from the electrode and generates an electronic signal representative of a detected electrical energy discharge;
   a controller communicatively coupled to the sensor, wherein the controller processes the electronic signal to control at least one characteristic of the electrical energy provided to the electrode;

a power supply that provides the electrical energy to the electrode; and a switch communicatively coupled to the controller to pulse the electrical energy from the power supply to the electrode, wherein the controller operates the switch to control the pulse width of electric energy, wherein the electrical energy is substantially unipolar.

2. The system of claim 1, wherein the at least one characteristic of the electrical energy includes voltage of the electrical energy provided to the electrode.

3. The system of claim 1, wherein the power supply is an arbitrary waveform generator.

4. The system of claim 1, wherein the power supply is a loosely coupled transformer.

5. A system that controls electrical energy discharge, including:

a power supply that generates electrical energy;

an electrode coupled to the power supply to discharge the electrical energy;

a sensor that detects the electrical energy discharged from the electrode and generates a signal therefrom;

a controller communicatively coupled to the sensor, wherein the controller processes the signal to control the voltage of the electrical energy in response to detecting the electrical energy discharged from the electrode; and a switch communicatively coupled to the controller to pulse the electrical energy from the power supply to the electrode, wherein the controller operates the switch to control the pulse width of electric energy, wherein the electrical energy is substantially unipolar.

6. A system that controls electrical energy discharge from an electrode, including:

a sensor that detects electrical energy discharged from the electrode and generates an electronic signal representative of a detected electrical energy discharge;

a controller communicatively coupled to the sensor, wherein the controller processes the electronic signal to control at least one characteristic of the electrical energy provided to the electrode;

a power supply that provides the electrical energy to the electrode; and a switch communicatively coupled to the controller to pulse the electrical energy from the power supply to the electrode, wherein the power supply is a loosely coupled transformer.

7. A system that controls electrical energy discharge, including:

a power supply that generates electrical energy;

an electrode coupled to the power supply to discharge the electrical energy;

a sensor that detects the electrical energy discharged from the electrode and generates a signal therefrom;

a controller communicatively coupled to the sensor, wherein the controller processes the signal to control the voltage of the electrical energy in response to detecting the electrical energy discharged from the electrode; and a switch communicatively coupled to the controller to pulse the electrical energy from the power supply to the electrode, wherein the controller operates the switch to control the pulse width of electric energy, wherein the power supply is a loosely coupled transformer.

* * * * *